Patented Dec. 18, 1945

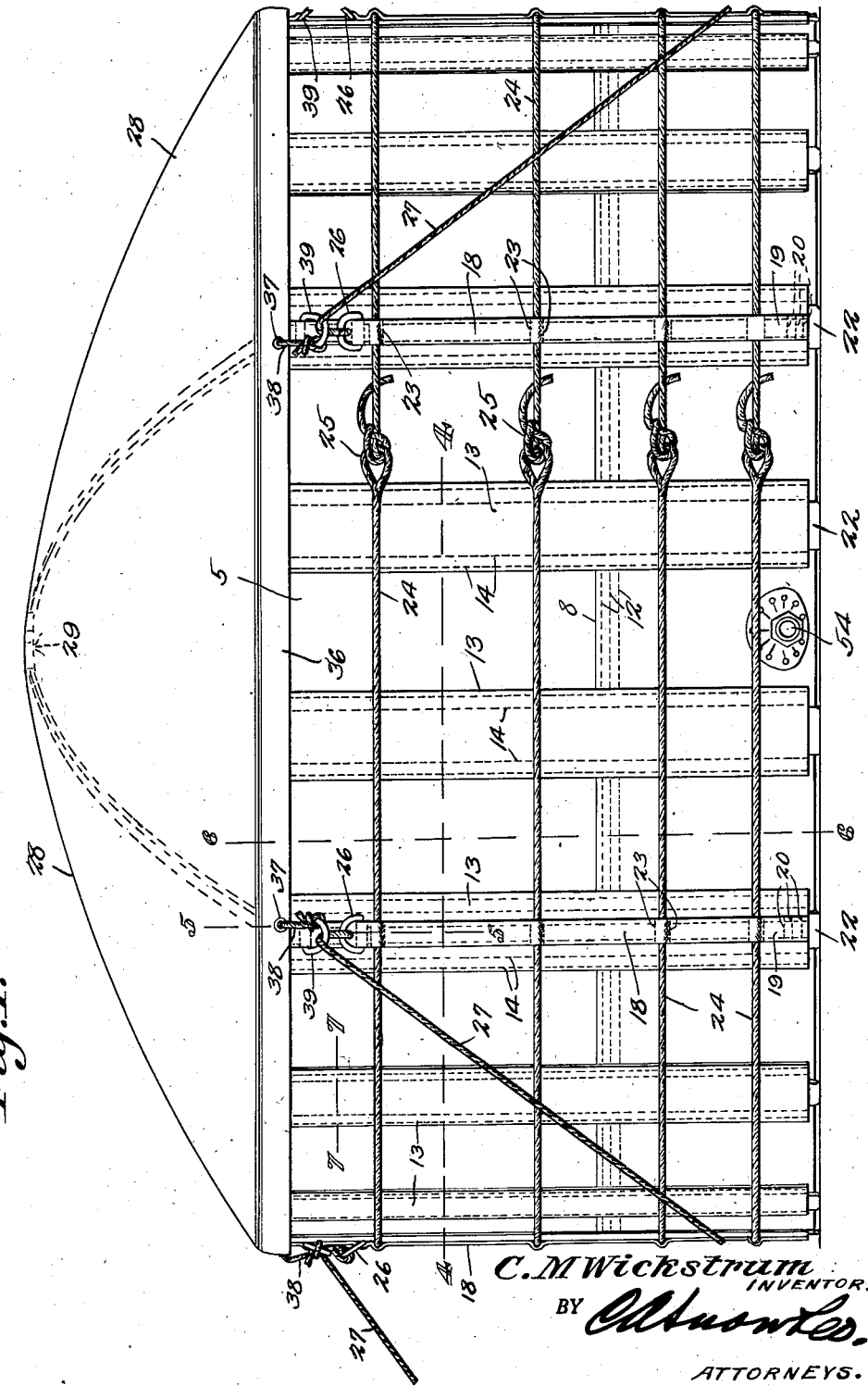

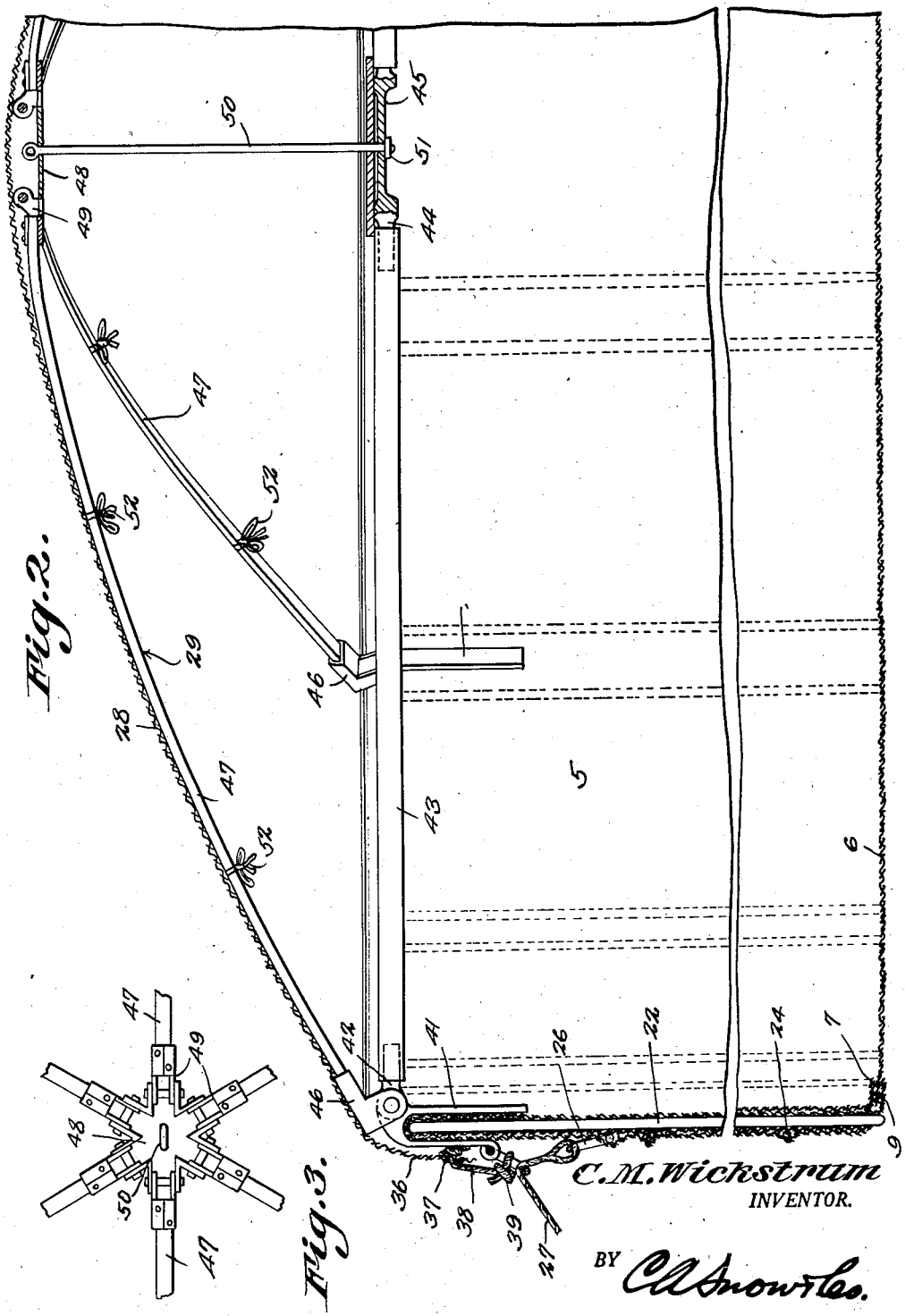

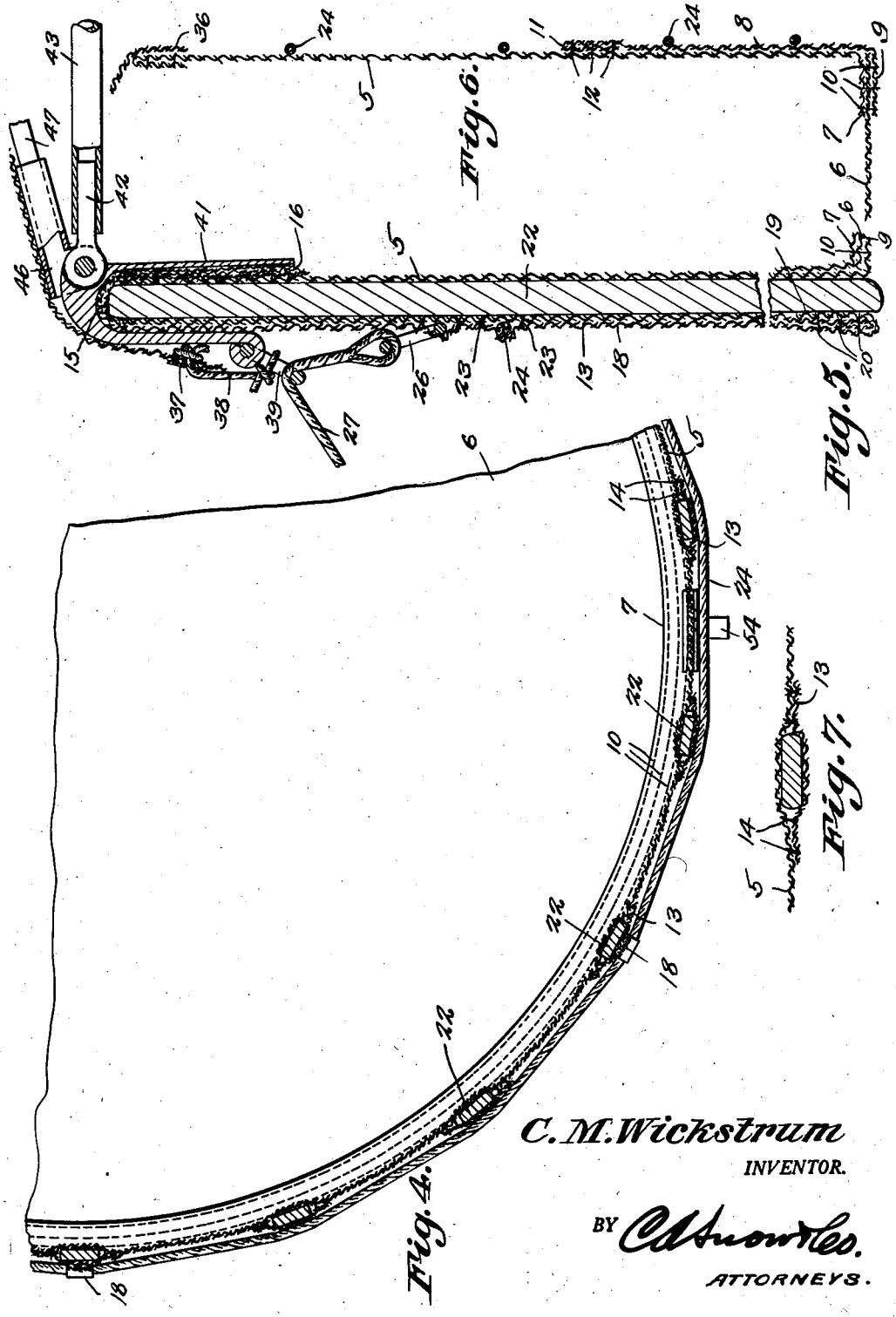

2,391,374

UNITED STATES PATENT OFFICE 2,391,374

PORTABLE STORAGE TANK

Cecil M. Wickstrum, Omaha, Nebr.

Application January 3, 1944, Serial No. 516,824

3 Claims. (Cl. 150—0.5)

This invention relates to storage tanks designed primarily for storing water, oils or other liquids, and more particularly to storage tanks of the portable type, wherein the body of the tank is constructed of heavy canvas material.

An important object of the invention is to provide a tank of this character wherein metals and critical war materials are reduced to the minimum, due consideration having been given to the strength, durability and ease of handling in erecting or dismantling the tank.

Another important object of the invention is to provide a tank which will be adequately braced to withstand severe strains caused by pressure against the wall of the tank, when the tank has been filled to its capacity.

Still another object of the invention is to provide a portable tank which may be folded into a comparatively small article when dismantled, to facilitate transportation and storage of the tank when not in use.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is an elevational view of a portable storage tank, designed for storing liquids and constructed in accordance with the invention.

Figure 2 is a fragmental enlarged elevational view of the tank.

Figure 3 is a plan view illustrating the connecting means between the flexible roof bars of the tank.

Figure 4 is a sectional view taken on line 4—4 of Figure 1.

Figure 5 is a sectional view taken on line 5—5 of Figure 1.

Figure 6 is a sectional view taken on line 6—6 of Figure 1.

Figure 7 is a sectional view taken on line 7—7 of Figure 1.

Referring to the drawings in detail, the body portion of the tank is indicated generally by the reference character 5, and is constructed preferably of heavy canvas material which may be treated to render the same absolutely waterproof.

The bottom of the tank, which is also constructed of waterproofed heavy canvas material, is indicated by the reference character 6 and is shaped to fit the general outline of the tank. As clearly shown by Figure 6 of the drawings, the bottom of the side wall or body of the tank is turned inwardly as at 7 and a reinforcing strip 8 of canvas material is provided to reinforce the lower portion of the body and the bottom 6. This reinforcing strip also has an inwardly extended lower end 9 which overlaps the bottom 6 directly under the inwardly turned portion 7, where it is secured to the portion 7 and bottom 6, by lines of stitching 10.

The reinforcing strip 8 extends an appreciable distance above the bottom 6, the upper edge thereof being folded downwardly as at 11, where it is secured to the body 5, by lines of stitching 12.

Wide reinforcing strips 13 extend vertically along the side of the body 5, and are secured along the side edges thereof, by means of lines of stitching 14, the lower ends of the reinforcing strips 13, terminating at points adjacent to the bottom of the tank, while the upper ends thereof are extended inwardly as at 15, from where they are extended downwardly as at 16.

The reference character 18 designates narrow strips of canvas material which extend throughout the lengths of certain of the reinforcing strips 13, the lower ends of the strips 18 being extended upwardly as at 19 where they engage the inner surfaces of the reinforcing strips 13, the upwardly extended ends being secured to the reinforcing strips and main portions of the strips 13, by lines of stitching 20. The upper ends of the strips 18 extend over the upper ends of the reinforcing strips 13 and pass downwardly, the downwardly extended ends of the strips 18, reinforcing strips 13 and side wall of the tank being secured together. Due to the construction of the reinforcing strips, and manner of securing the strips to the side wall of the body or tank, it will be seen that I have provided vertical pockets extending throughout the height of the tank, and in spaced relation with respect to each other, around the tank, the upper ends of the pockets being closed. These pockets are designed to receive the staves or uprights 22 which are constructed of wood, preferably hickory, the upper ends of the staves engaging the closed ends of the pockets to hold the body of the tank in an upright position. The lower ends of the staves extend through the lower ends of the pockets and rest on the supporting surface. Pairs of spaced horizontal lines of stitching indicated at 23, are arranged throughout the length of the strips 18 and provide openings, through which the ropes 24 are extended, which ropes encircle the body of the tank, the ends thereof being tied as at 25. Certain of the strips 18 are formed with openings, through which the standard D rings are secured, the rings being indicated by the reference character 26. These D rings, provide means whereby guy lines 27 are secured to the body portion of the tank, the lower ends of the guy lines being staked to the ground surface and tightened, to hold the tank wall in a vertical or upright position.

The top 28 is dome-shaped in formation and is also constructed of canvas material, the lower edge of the top 28 being extended downwardly as at 36, to overlap the upper edge of the side wall of the tank or body. Reinforcing rings 37 are secured in the downwardly extended portion 36 of the top, the rings 37 being so disposed that they fall opposite to the D rings 26. Ropes 38 are secured to the top 28 and extend through the rings 37, the ropes 38 being tied to the D rings 39, secured to the frame on which the top 28 is supported, holding the lower edge of the top in position at all times.

The canvas top 28 is supported and stretched over the frame indicated generally by the reference character 29, which is substantially dome-shaped, when in its extended position. This frame embodies brackets 41 which are substantially inverted U-shaped, to be positioned over the upper ends of the staves or uprights 22, as clearly shown by Figure 5 of the drawings. One leg of each bracket 41 is bent around the D ring 39, securing the ring in position on the bracket, to which the rope 38, associated therewith, is connected.

Pivotally connected with each bracket 41 is a substantially short arm 42 to which the ends of the bars 43 are connected by extending the arms 42 into the ends of the bars 43 as shown by Fig. 5. These bars 43 extend horizontally and have their inner ends connected to the extensions 44, which are removably connected with the plate 45. Socket members 46 are also pivotally connected to the brackets 41, and receive the outer ends of the flexible bars 47 of the frame. The bars 47 have their inner ends connected to the central plate 48 by means of the members 49, which have pivotal connection with the plate 48. The bars 47 are constructed of hickory or other flexible material so that they will form an arch when bars 43 are connected to plate 45. This construction allows folding the supporting frame work for the top into a compact bundle to enhance easy erection, dismantling and transportation.

The plates 45 and 48 are held in spaced relation with respect to each other, by means of the rod 50 that extends through openings in the plates, the lower end of the rod being supplied with a nut 51 for securing the rod in place.

The canvas top is supplied with tie cords 52 that fall directly over the bars 47, and to which the cords 52 may be tied, securing the canvas top in position on the frame.

In order that the contents of the tank may be drained, an outlet opening is provided adjacent to the bottom of the tank, the outlet opening embodying a threaded ring, which is riveted or otherwise secured to the wall of the tank. A plug 54 is positioned within the threaded ring and will provide a watertight means for closing the outlet opening.

From the foregoing it will be seen that due to the construction shown and described, I have provided a water storage tank which may be readily and easily dismantled or erected, and one which may be stored and transported with facility.

When it is desired to erect the tank, the staves are positioned within the openings and the body of the tank erected. The guy lines are now tightened and the top is positioned in a manner as described.

What is claimed is:

1. A portable storage tank, comprising a body constructed of fabric material, vertical staves secured to the body, a top for the body, said top including a collapsible frame, embodying brackets adapted to be fitted over the upper ends of the body and staves, horizontal bars pivotally connected with the brackets, flexible bars pivotally connected with the brackets, a plate connecting the inner ends of said flexible bars, a plate connecting the inner ends of the horizontal bars, means for holding the plates spaced apart, a fabric cover adapted to be stretched over said top frame, and a bottom forming a part of the tank.

2. A portable storage tank comprising a body constructed of fabric material and adapted to contain liquid, vertical upright staves removably secured to the body, a top frame embodying inverted U-shaped brackets adapted to fit over the upper edge of the body and staves, horizontal bars pivotally connected with the brackets extending inwardly and removably connected to a center plate, flexible bars pivotally connected to the brackets and extending upwardly and inwardly and being pivotally connected with the upper plate, means for holding the plates in spaced relation in respect to each other, a fabric covering to be stretched over said frame, and a bottom forming a part of the tank.

3. A portable storage tank comprising an upright body adapted to contain liquid, constructed of fabric material, vertical upright staves removably secured to the body, a top frame embodying inverted U-shaped brackets providing leg members adapted to fit over the upper edge of the body and staves, a D-ring secured to the outer leg member of each bracket, D-rings secured to the body and disposed directly under the U-shaped brackets, guy lines secured to the D-rings secured to the body portion and adapted to be extended upwardly through the D-rings of the brackets and be secured at the ends of the guy lines, holding the body in an upright position, and at the same time drawing the top frame into close engagement with the body.

CECIL M. WICKSTRUM.